(12) United States Patent
Lee et al.

(10) Patent No.: US 9,100,818 B2
(45) Date of Patent: Aug. 4, 2015

(54) APPARATUS AND METHOD FOR ALLOCATING D2D ID OF USER TERMINAL IN AD-HOC NETWORK

(75) Inventors: Ok-Seon Lee, Suwon-si (KR); Pil-Yong Hwang, Gimpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 13/567,480

(22) Filed: Aug. 6, 2012

(65) Prior Publication Data
US 2013/0040677 A1    Feb. 14, 2013

(30) Foreign Application Priority Data
Aug. 8, 2011    (KR) .................. 10-2011-0078617

(51) Int. Cl.
*H04B 7/00*    (2006.01)
*H04W 8/26*    (2009.01)
*H04W 8/00*    (2009.01)
*H04W 84/18*    (2009.01)

(52) U.S. Cl.
CPC ............. *H04W 8/26* (2013.01); *H04W 8/005* (2013.01); *H04W 84/18* (2013.01)

(58) Field of Classification Search
USPC ......... 455/41.2, 500, 517, 518; 370/254, 255, 370/328, 338
See application file for complete search history.

(56) References Cited

U.S. PATENT DOCUMENTS

| | | | |
|---|---|---|---|
| 6,246,696 B1* | 6/2001 | Yamaguchi et al. | 370/475 |
| 7,075,897 B2* | 7/2006 | Uematsu | 370/255 |
| 8,014,763 B2* | 9/2011 | Hymes | 455/414.2 |
| 2005/0226169 A1* | 10/2005 | Kelsey et al. | 370/254 |
| 2008/0004017 A1* | 1/2008 | Shimizu | 455/435.1 |
| 2009/0207445 A1* | 8/2009 | Kimura | 358/1.15 |
| 2010/0008235 A1* | 1/2010 | Tinnakornsrisuphap et al. | 370/241 |
| 2010/0260064 A1* | 10/2010 | Garg et al. | 370/254 |

* cited by examiner

*Primary Examiner* — Nguyen Vo
(74) *Attorney, Agent, or Firm* — Jefferson IP Law, LLP

(57) ABSTRACT

An apparatus and a method for allocating a Device-to-Device (D2D) IDentity (ID) of a user terminal in an ad-hoc network are provided. The method includes determining that a first D2D ID allocated to the user terminal is duplicated with a second D2D ID allocated to at least one other terminal located within a predefined range from the user terminal, determining whether the user terminal is in communication, when the first D2D ID is duplicated with the second D2D ID, and changing the first D2D ID into a third D2D ID with reference to a D2D ID pool so that the first D2D ID is not duplicated with the second D2D ID, when the user terminal is not in communication.

18 Claims, 9 Drawing Sheets

APPARATUS AND METHOD FOR ALLOCATING D2D ID OF USER TERMINAL IN AD-HOC NETWORK

PRIORITY

This application claims the benefit under 35 U.S.C. §119(a) of a Korean patent application filed on Aug. 8, 2011 in the Korean Intellectual Property Office and assigned Serial No. 10-2011-0078617, the entire disclosure of which is hereby incorporated by reference.

BACKGROUND OF THE INVENTION

1. Field of the Invention

The present invention relates to an apparatus and a method for allocating a Device-to-Device (D2D) IDentity (ID). More particularly, the present invention relates to an apparatus and a method for allocating a D2D ID of a user terminal in a communication network.

2. Description of the Related Art

An ad-hoc network refers to a network that is configured autonomously by nodes and has no base structure. The ad-hoc network does not require a base network apparatus, such as a base station or an access point, for network configuration and maintenance.

In an ad-hoc network, nodes communicate with each other using a wireless interface and overcome a restriction on a communication distance of the wireless interface through a multi-hop routing function. In addition, since the nodes are free to move, network topology changes dynamically. An ad-hoc network may be completely independent, and may be linked through an Internet gateway to a base network, such as the Internet. Examples of application of the ad-hoc network include emergency rescue networks, urgent conference networks, and military networks in battlefields.

However, in an ad-hoc network system of the related art, there is no object that allocates a Device-to-Device (D2D) IDentity (ID), and there is no object that controls a collision that may occur between terminals because D2D IDs are substantially identical.

In addition, an ID, such as a Media Access Control (MAC) address, may be used for the same purpose as a D2D ID, but a problem related to signaling overhead or security may arise because the ID is long.

Therefore, a need exists for an apparatus and a method for allocating a D2D ID of a user terminal in a communication network.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages below. Accordingly, an aspect of the present invention is to provide an apparatus and a method for allocating a Device-to-Device (D2D) IDentity (ID) of a user terminal in an ad-hoc network, which defines a new D2D ID pool instead of a Media Access Control (MAC) address with large overhead and avoids a D2D ID collision between the user terminal and an adjacent terminal by changing a D2D ID of the user terminal.

Another aspect of the present invention is to provide the convenience of being able to perform smooth communication by requesting a D2D ID change from a user terminal when a D2D ID collision occurs between the user terminal and an adjacent terminal.

Another aspect of the present invention is to avoid a D2D ID collision even between terminals that cannot be determined due to a distance, by determining a D2D ID collision/non-collision between other terminals by a terminal located between the other terminals.

According to an aspect of the present invention, a method for allocating a D2D ID of a user terminal in an ad-hoc network is provided. The method includes determining that a first D2D ID allocated to the user terminal is duplicated with a second D2D ID allocated to at least one other terminal located within a predefined range from the user terminal, when the first D2D ID is duplicated with the second D2D ID, determining whether the user terminal is in communication, and when the user terminal is not in communication, changing the first D2D ID into a third D2D ID with reference to a D2D ID pool so that the first D2D ID is not duplicated with the second D2D ID.

The method may further include transmitting the third D2D ID to the at least one other terminal and updating the D2D ID pool.

Determining that the first D2D ID allocated to the user terminal is duplicated with the second D2D ID allocated to the at least one other terminal located within a predefined range from the user terminal may include determining whether the first D2D ID and the second D2D ID are duplicated with each other.

Determining that the first D2D ID allocated to the user terminal is duplicated with the second D2D ID allocated to the at least one other terminal located within a predefined range from the user terminal may include receiving a request for change of the first D2D ID from the at least one other terminal when the first D2D ID and the second D2D ID are duplicated with each other.

The method may further include, when the user terminal is in communication, comparing a priority of a service flow of the user terminal with a priority of a service flow of a terminal allocated the second D2D ID, when the priority of the service flow of the user terminal is lower than the priority of the service flow of the terminal, transmitting a standby message to a terminal communicating with the user terminal, and executing the D2D ID pool to change the first D2D ID into the third D2D ID so that the first D2D ID is not duplicated with the second D2D ID.

Comparing the priorities of the service flows may include, when the priority of the service flow of the user terminal is higher than the priority of the service flow of the terminal, transmitting a D2D ID change rejection message to the terminal allocated the second D2D ID, determining whether a D2D ID duplication end message indicating the end of a D2D ID duplication between the user terminal and the terminal allocated the second D2D ID is received from the terminal allocated the second D2D ID, when the D2D ID duplication end message is not received, transmitting a standby message to a terminal communicating with the user terminal, and executing the D2D ID pool to change the first D2D ID into the third D2D ID so that the first D2D ID is not duplicated with the second D2D ID.

Comparing the priorities of the service flows may include, determining whether a service flow of the user terminal is a real-time service, and when the service flow of the user terminal is a real-time service, transmitting a rejection message from the user terminal to the terminal allocated the second D2D ID.

According to another aspect of the present invention, a method for allocating a D2D ID of a user terminal in an ad-hoc network is provided. The method includes (1) determining whether D2D IDs of two or more other terminals located within a predefined range from the user terminal are duplicated with each other, (2) when the D2D IDs are duplicated with each other, notifying a D2D ID duplication to the two or more other terminals by the user terminal, (3) when the two or more other terminals notified of the D2D ID duplication are not in communication, executing a D2D ID pool to change the D2D IDs so that the D2D IDs are not duplicated with each other, (4) receiving the changed D2D ID from one of the two or more other terminals and transmitting the received D2D ID to the other of the two or more other terminals, and (5) updating the D2D ID pool.

The method may further include, when the two or more other terminals are in communication in the operation (3), executing the D2D ID pool after completion of the communication, to change the D2D IDs so that the D2D IDs are not duplicated with each other, and repeating the operations (4) and (5).

The operation (1) may include receiving a Global Positioning System (GPS) position and a D2D ID of one of the two or more other terminals and transmitting the received GPS position and D2D ID to the other of the two or more other terminals.

According to another aspect of the present invention, an apparatus for allocating a D2D ID of a user terminal in an ad-hoc network is provided. The apparatus includes a determination unit for determining that a first D2D ID allocated to the user terminal is duplicated with a second D2D ID allocated to at least one other terminal located within a predefined range from the user terminal, when the first D2D ID is duplicated with the second D2D ID, determining whether the user terminal is in communication, and when the user terminal is not in communication, changing the first D2D ID into a third D2D ID with reference to a D2D ID pool so that the first D2D ID is not duplicated with the second D2D ID, and a storage unit for storing information controlled by the determination unit.

The apparatus may further include a communication module for transmitting the third D2D ID to the at least one other terminal, and an update unit for updating the D2D ID pool.

The determination unit may determine whether the first D2D ID and the second D2D ID are duplicated with each other.

The apparatus may further include a communication module for receiving a request for change of the first D2D ID from the at least one other terminal when the first D2D ID and the second D2D ID are duplicated with each other.

When the user terminal is in communication, the determination unit may compare a priority of a service flow of the user terminal with a priority of a service flow of a terminal allocated the second D2D ID, and execute the D2D ID pool to change the first D2D ID into the third D2D ID so that the first D2D ID is not duplicated with the second D2D ID, and the apparatus may further include a communication unit for transmitting a standby message to a terminal communicating with the user terminal, when the priority of the service flow of the user terminal is lower than the priority of the service flow of the terminal.

The communication unit may transmit a D2D ID change rejection message to the terminal allocated the second D2D ID when the priority of the service flow of the user terminal is higher than the priority of the service flow of the terminal, and may transmit a standby message to a terminal communicating with the user terminal when a D2D ID duplication end message is not received, and the determination unit may determine whether a D2D ID duplication end message indicating the end of a D2D ID duplication between the user terminal and the terminal allocated the second D2D ID is received from the terminal allocated the second D2D ID, and may execute the D2D ID pool to change the first D2D ID into the third D2D ID so that the first D2D ID is not duplicated with the second D2D ID.

The determination unit may determine whether a service flow of the user terminal is a real-time service, and the communication unit may transmit a rejection message from the user terminal to the terminal allocated the second D2D ID when the service flow of the user terminal is a real-time service.

According to another aspect of the present invention, an apparatus for allocating a D2D ID of a user terminal in an ad-hoc network is provided. The apparatus includes a determination unit for determining whether D2D IDs of two or more other terminals located within a predefined range from the user terminal are duplicated with each other, and executing a D2D ID pool to change the D2D IDs so that the D2D IDs are not duplicated with each other, when the two or more other terminals notified of a D2D ID duplication are not in communication, a communication module for notifying, when the D2D IDs are duplicated with each other, a D2D ID duplication to the two or more other terminals by the user terminal, receiving the changed D2D ID from one of the two or more other terminals, and transmitting the received D2D ID to the other of the two or more other terminals, and an update unit for updating the D2D ID pool.

When the two or more other terminals are in communication, the determination unit may execute the D2D ID pool after completion of the communication, to change the D2D IDs so that the D2D IDs are not duplicated with each other.

The communication module may receive a GPS position and a D2D ID of one of the two or more other terminals and transmit the received GPS position and D2D ID to the other of the two or more other terminals.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and configurations may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An exemplary embodiment of the present invention relates to an apparatus and a method for allocating a Device-to-Device (D2D) IDentity (ID) of a user terminal in an ad-hoc network.

FIGS. 1 through 8, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
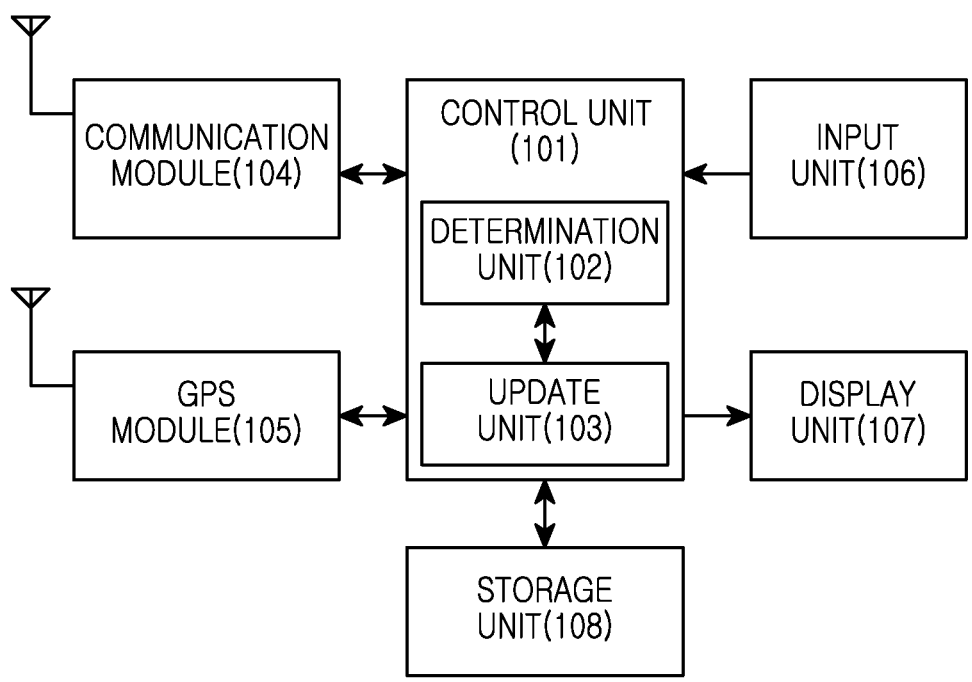
FIG. 1 is a block diagram illustrating a configuration of an apparatus for allocating a Device-to-Device (D2D) IDentity (ID) of a user terminal in an ad-hoc network according to an exemplary embodiment of the present invention.

FIG. 1 is a block diagram illustrating a configuration of an apparatus for allocating a D2D ID of a user terminal in an ad-hoc network according to an exemplary embodiment of the present invention.

Referring to FIG. 1, an apparatus for allocating a D2D ID of a user terminal in a network without a base structure may include a control unit 101, a determination unit 102, an update unit 103, a communication module 104, a Global Positioning System (GPS) module 105, an input unit 106, a display unit 107, and a storage unit 108.

The control unit 101 may control an overall operation of the user terminal, and include the determination unit 102 and the update unit 103.

The determination unit 102 may determine whether a first D2D ID allocated to the user terminal is duplicated with a second D2D ID allocated to at least one other terminal (i.e., an adjacent terminal) located within a predefined range from the user terminal. When the first D2D ID is duplicated with the second D2D ID, the determination unit 102 may determine whether the user terminal is under communication.

When the user terminal is not under communication, the determination unit 102 may execute a D2D ID pool to change the first D2D ID into a third D2D ID so that the first D2D ID is not duplicated with the second D2D ID.

The determination unit 102 may determine whether D2D IDs of two or more other terminals located within a predefined range from the user terminal are duplicated with each other. When the D2D IDs of the two or more other terminals are duplicated with each other, the determination unit 102 may notify a D2D ID duplication to the two or more other terminals and determine whether the two or more other terminals are under communication. When the two or more other terminals are not under communication, the determination unit 102 may execute a D2D ID pool to change the D2D IDs so that the D2D IDs are not duplicated with each other.

The update unit 103 may update data inputted from the input unit 106, or data received from the communication module 104 and the GPS module 105. For example, the update unit 103 may update a D2D ID pool.

The communication module 104 may process signals transmitted/received through an antenna for voice and data communication. For example, the communication module 104 may transmit the third D2D ID to at least one other terminal.

When the first D2D ID allocated to the user terminal is duplicated with the second D2D ID allocated to at least one other terminal located within a predefined range from the user terminal, the communication module 104 may receive a request for change of the first D2D ID from the at least one other terminal.

When the D2D IDs of the two or more other terminals are duplicated with each other, the communication module 104 may notify a D2D ID duplication to the two or more other terminals. The communication module 104 may receive a changed D2D ID from one of the two or more other terminals and transmit the received D2D ID to the other of the two or more other terminals.

The GPS module 105 may receive GPS time information and position information from a GPS satellite. For example, in order to determine whether D2D IDs of two or more other terminals (i.e., adjacent terminals) located within a predefined range from the user terminal are duplicated with each other, the user terminal may receive a D2D ID from the adjacent terminal together with position information. Herein, the GPS module 105 may receive the position of the terminal from the GPS satellite.

The input unit 106 may provide the control unit 101 with input data generated by user selection.

The display unit 107 may display a command inputted through the input unit 106 or data stored in the storage unit 108, under the control of the control unit 101.

The storage unit 108 may include a program storage unit for storing a program for controlling an operation of the user terminal, and a data storage unit for storing data generated during the execution of a program.

In the above block configuration, the control unit 101 may perform an overall function of the user terminal. The above configurations should be considered in descriptive sense only and not for the purpose of limitation, and those skilled in the art will understand that various changes may be made therein without departing from the scope of the present invention. For example, although the respective units are configured and illustrated separately, the control unit 101 may be configured to perform all or some of the functions of the respective units.

Figure 2:
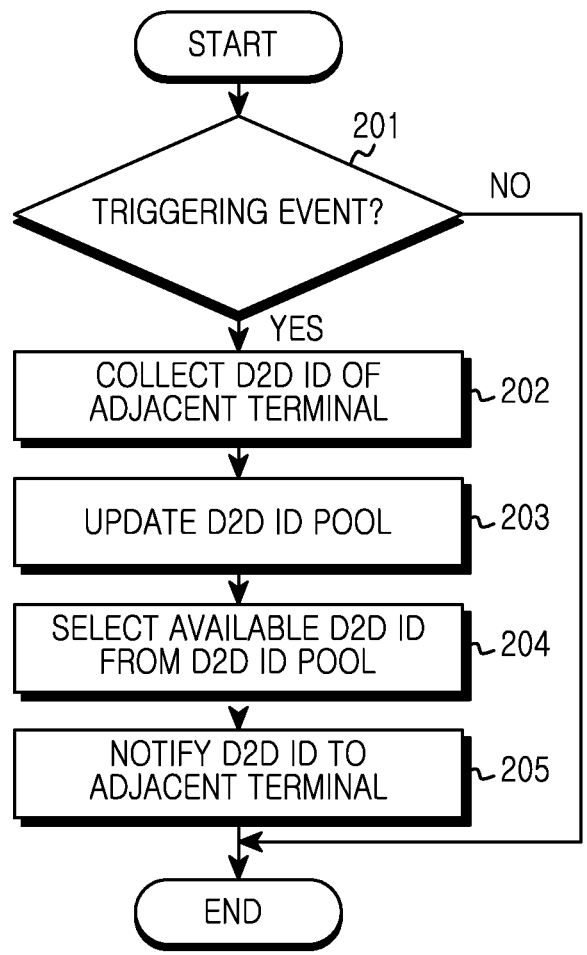
FIG. 2 is a flowchart illustrating a method for allocating a D2D ID of a user terminal in an ad-hoc network according to an exemplary embodiment of the present invention.

FIG. 2 is a flowchart illustrating a method for allocating a D2D ID of a user terminal in an ad-hoc network according to an exemplary embodiment of the present invention.

Referring to FIG. 2, the user terminal determines whether a triggering event occurs at step 201. Examples of the triggering event may include the start of a D2D mode, application of power to the terminal in an idle mode, movement of the terminal to another region, and expiration of an allocated D2D ID.

When a triggering event occurs at step 201, the user terminal collects D2D ID information of an adjacent terminal at step 202. For example, the adjacent terminal may broadcast its D2D ID at predefined periods, and the user terminal may receive the broadcast to collect the D2D ID information.

When receiving the D2D ID information of the adjacent terminal, the user terminal updates its D2D ID pool based on the received D2D ID information at step 203. Thereafter, the user terminal selects an available D2D ID from the updated D2D ID pool at step 204, and notifies the selected D2D ID to the adjacent terminal at step 205. Thereafter, the process of the method is ended.

On the other hand, when a triggering event does not occur at step 201, the process of the method may be ended without starting the process of D2D ID allocation to the user.

Figure 3A:
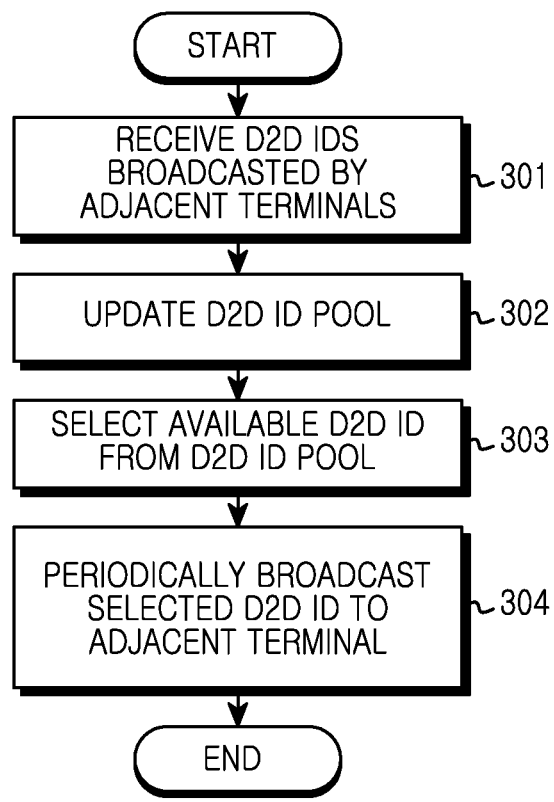
FIGS. 3A and 3B are flowcharts illustrating a process of updating a D2D ID pool in a method for allocating a D2D ID of a user terminal in an ad-hoc network according to exemplary embodiments of the present invention.
Figure 3B:
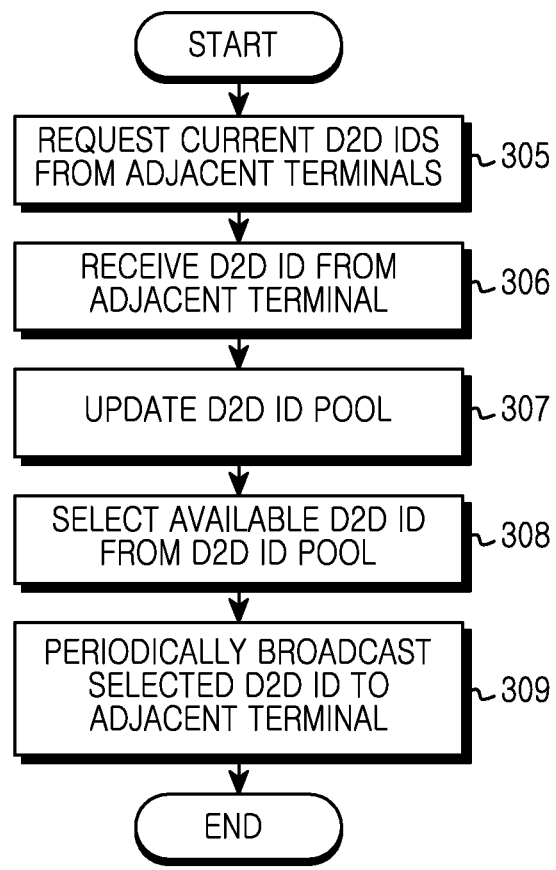

FIGS. 3A and 3B are flowcharts illustrating a process of updating a D2D ID pool in a method for allocating a D2D ID of a user terminal in an ad-hoc network according to exemplary embodiments of the present invention.

Referring to FIG. 3A, a process of updating, by the user terminal, a D2D ID pool by changing a D2D ID is illustrated.

The user terminal receives D2D IDs broadcasted by adjacent terminals at step 301, and updates its D2D ID pool based on the received D2D IDs at step 302. Thereafter, the user terminal selects an available D2D ID from the updated D2D ID pool at step 303, and periodically broadcasts the selected D2D ID to the adjacent terminal at step 304. Thereafter, the D2D ID pool update process is ended.

Referring to FIG. 3B, a process of updating, by the user terminal, a D2D ID pool by requesting a D2D ID change from an adjacent terminal is illustrated. The user terminal requests transmission of current D2D IDs from adjacent terminals at step 305. Thereafter, the user terminal receives the D2D ID from the adjacent terminal at step 306, and updates its D2D ID pool based on the received D2D ID at step 307. The user terminal selects an available D2D ID from the updated D2D ID pool at step 308, and periodically broadcasts the selected D2D ID to the adjacent terminal at step 309. Thereafter, the D2D ID pool update process is ended.

Figure 4:
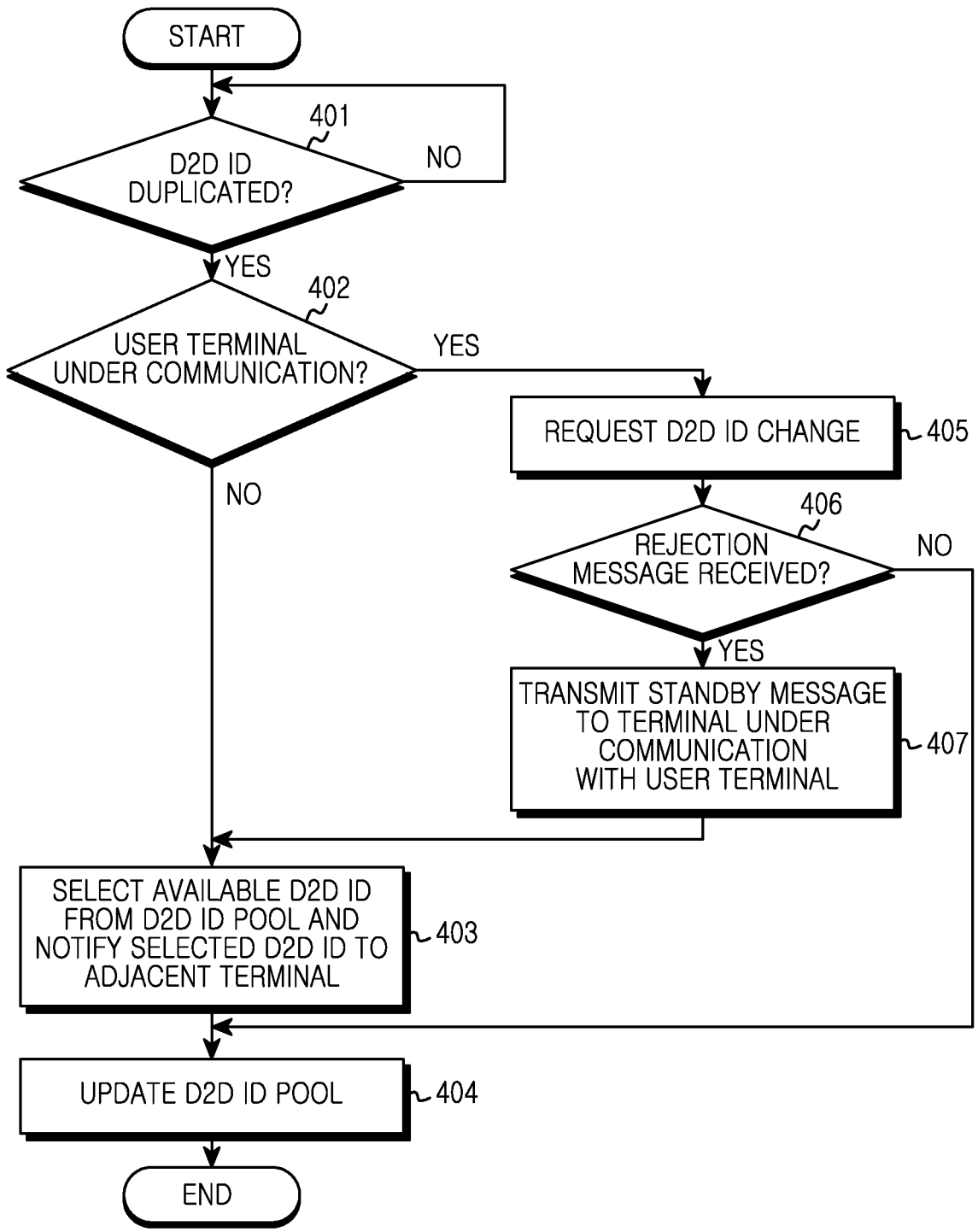
FIG. 4 is a flowchart illustrating a process of changing a D2D by a user terminal ID in the event of a D2D ID collision in a method for allocating a D2D ID of the user terminal in an ad-hoc network according to an exemplary embodiment of the present invention.

FIG. 4 is a flowchart illustrating a process of changing a D2D ID by a user terminal in the event of a D2D ID collision in a method for allocating a D2D ID of the user terminal in an ad-hoc network according to an exemplary embodiment of the present invention.

Referring to FIG. 4, the user terminal determines whether a first D2D ID allocated to the user terminal is duplicated (collided) with a second D2D ID allocated to at least one other terminal (i.e., an adjacent terminal) located within a predefined range from the user terminal at step 401. Herein, the predefined range may be a communication range of the user terminal.

When the first D2D ID and the second D2D ID are duplicated with each other at step 401, the user terminal determines whether the user terminal is under communication at step 402. When the user terminal is not under communication, the user terminal executes a D2D ID pool to change the first D2D ID into a third D2D ID so that the first D2D ID is not duplicated with the second D2D ID, and notifies the changed D2D ID (i.e., the third D2D ID) to the adjacent terminal at step 403.

Thereafter, the user terminal updates its D2D ID pool based on the changed D2D ID (i.e., the third D2D ID) at step 404, and completes the process.

When the user terminal is under communication at step 402, the user terminal requests at least one other terminal (i.e., an adjacent terminal) to change the second D2D ID duplicated with the first D2D ID at step 405. Thereafter, the user terminal determines whether an acceptance message for the request is received from the at least one other terminal at step 406. When the acceptance message is not received (i.e., when a rejection message is received), the user terminal transmits a standby message to the terminal under communication with the user terminal at step 407. After transmission of the standby message, the user terminal repeats steps 403 and 404 and ends the process.

On the other hand, when the acceptance message is received (i.e., when the rejection message is not received) at step 406, the user terminal updates its D2D ID pool based on the changed D2D ID (i.e., the second D2D ID) at step 404 and ends the process.

Figure 5:
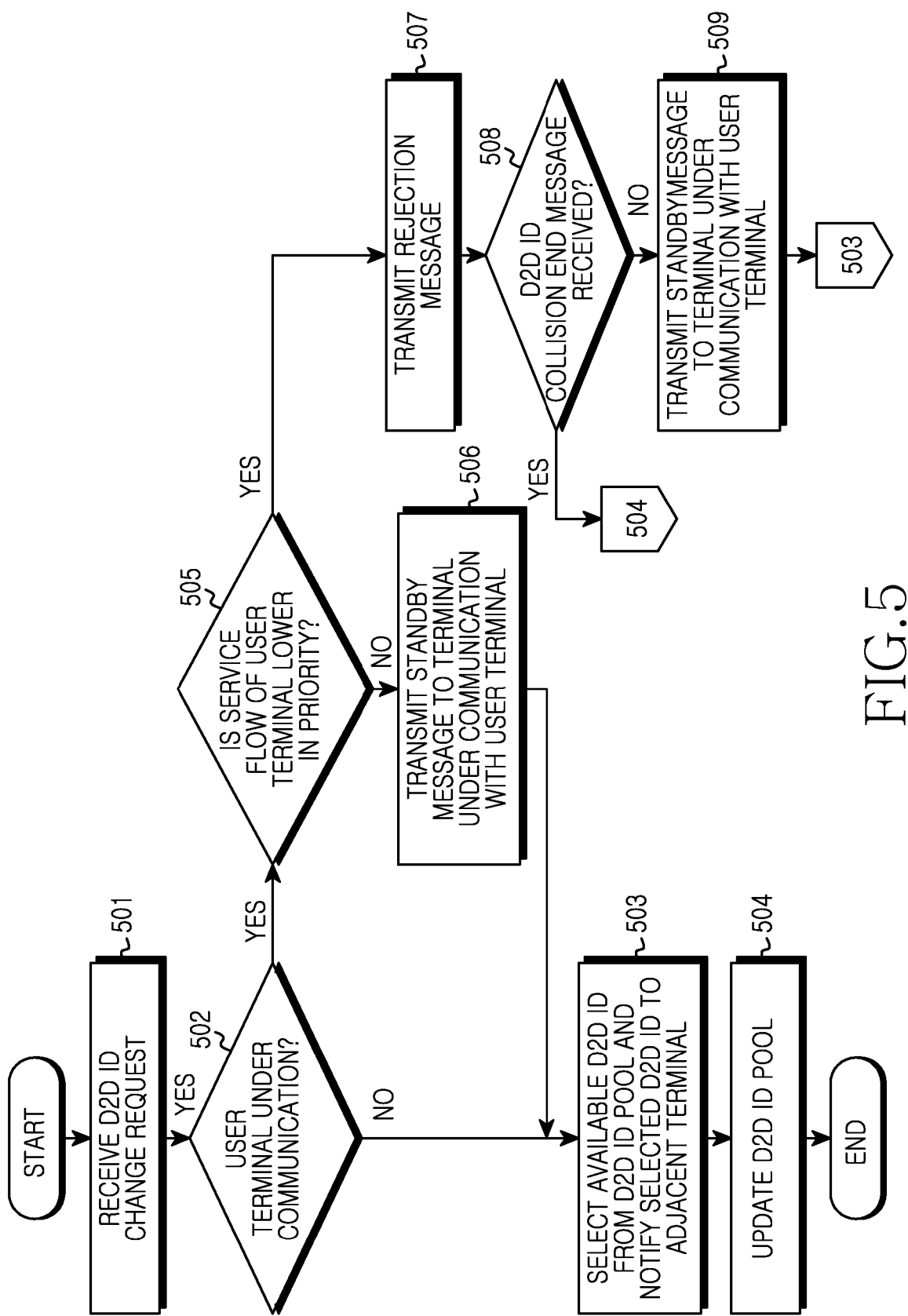
FIG. 5 is a flowchart illustrating a process of changing a D2D ID by a user terminal at a received D2D ID change request in the event of a D2D ID collision in a method for allocating a D2D ID of the user terminal in an ad-hoc network according to an exemplary embodiment of the present invention.

FIG. 5 is a flowchart illustrating a process of changing a D2D ID by a user terminal at a received D2D ID change request in the event of a D2D ID collision in a method for allocating a D2D ID of the user terminal in an ad-hoc network according to an exemplary embodiment of the present invention.

Referring to FIG. 5, when a first D2D ID allocated to the user terminal is duplicated with a second D2D ID allocated to at least one other terminal located within a predefined range from the user terminal, the user terminal receives a request for change of the first D2D ID from the at least one other terminal at step 501.

Thereafter, the user terminal determines whether the user terminal is under communication at step 502. When the user terminal is not under communication, the user terminal executes a D2D ID pool to change the first D2D ID into a third D2D ID so that the first D2D ID is not duplicated with the second D2D ID, and transmits the third D2D ID to the at least one other terminal at step 503. Thereafter, the user terminal completes D2D ID pool update at step 504 and ends the process.

On the other hand, when the user terminal is under communication at step 502, the user terminal compares the priority of a service flow of the user terminal with the priority of a service flow of the terminal that has requested a D2D ID change at step 505. Herein, regarding the priority of service flows of the terminals, a real-time service is higher in priority than a non-real-time service, and a higher response speed is higher in priority than a lower response speed.

When the priority of a service flow of the user terminal is lower than the priority of a service flow of the terminal that has requested a D2D ID change at step 505, the user terminal transmits a standby message to the terminal under communication with the user terminal at step 506. Thereafter, the user terminal repeats steps 503 and 504 to change the first D2D ID into the third D2D ID.

On the other hand, when the priority of a service flow of the user terminal is higher than the priority of a service flow of the terminal that has requested a D2D ID change at step 505, the user terminal transmits a D2D change rejection message to the terminal that has requested a D2D ID change at step 507. Thereafter, the user terminal determines whether a message indicating the end of a D2D ID duplication between the user terminal and the terminal that has requested a D2D ID change is received from the terminal that has requested a D2D ID change at step 508.

When a duplication end message is not received from the terminal that has requested a D2D ID change at step 508, the user terminal transmits a standby message to the terminal under communication with the user terminal at step 509. Thereafter, the user terminal repeats steps 503 and 504.

On the other hand, when a duplication end message is received from the terminal that has requested a D2D ID change at step 508, the user terminal updates a D2D ID pool at step 504 and ends the process.

Figure 6:
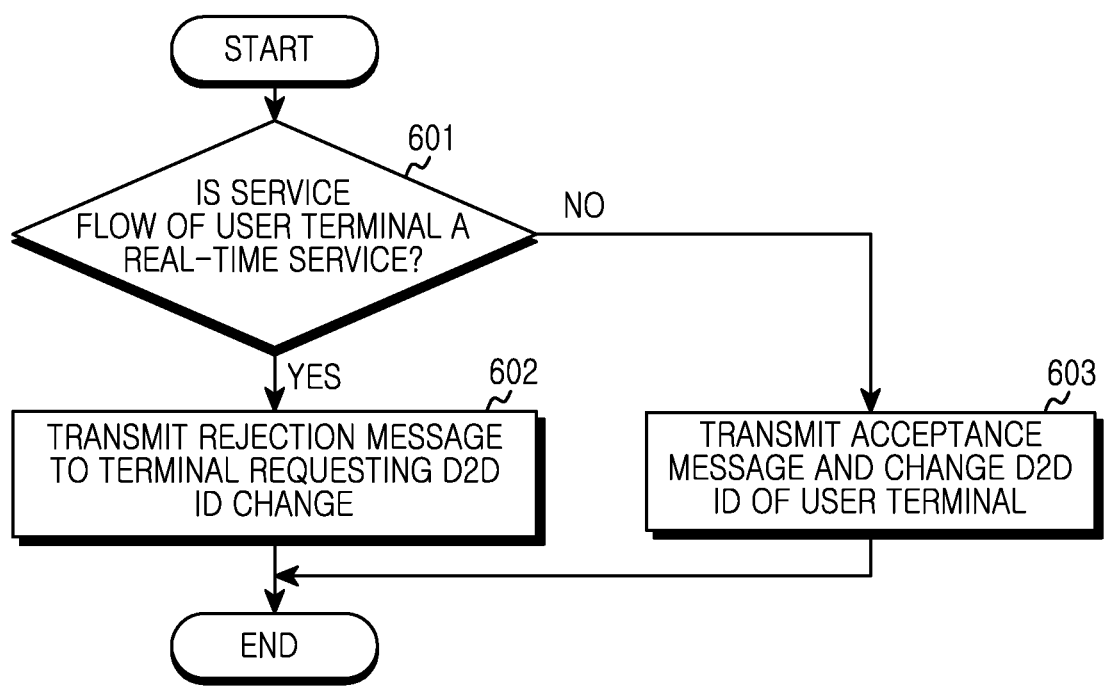
FIG. 6 is a flowchart illustrating a process of comparing priorities of service flows of terminals in a method for allocating a D2D ID of a user terminal in an ad-hoc network according to an exemplary embodiment of the present invention.

FIG. 6 is a flowchart illustrating a process of comparing priorities of service flows of terminals in a method for allocating a D2D ID of a user terminal in an ad-hoc network according to an exemplary embodiment of the present invention.

Referring to FIG. 6, when receiving a D2D ID change request, the user terminal determines whether a currently performed service flow is a real-time service at step 601.

Herein, regarding the priority of a service flow of the terminal, a real-time service is higher in priority than a non-real-time service. The real-time service is to be provided immediately at a user's request, examples of which may include a real-time response to a stock information request. The non-real-time service is not to be provided immediately at a user's request, examples of which may include a service for tomorrow's weather.

When the service flow of the user terminal is a real-time service at step 601, the user terminal transmits a D2D ID change rejection message to the terminal that has requested a D2D ID change at step 602 and completes the process.

On the other hand, when the service flow of the user terminal is not a real-time service at step 601, the user terminal transmits a D2D ID change acceptance message to the terminal that has requested a D2D ID change, and changes a D2D ID of the user terminal at step 603. Thereafter, the process is completed.

Figure 7:
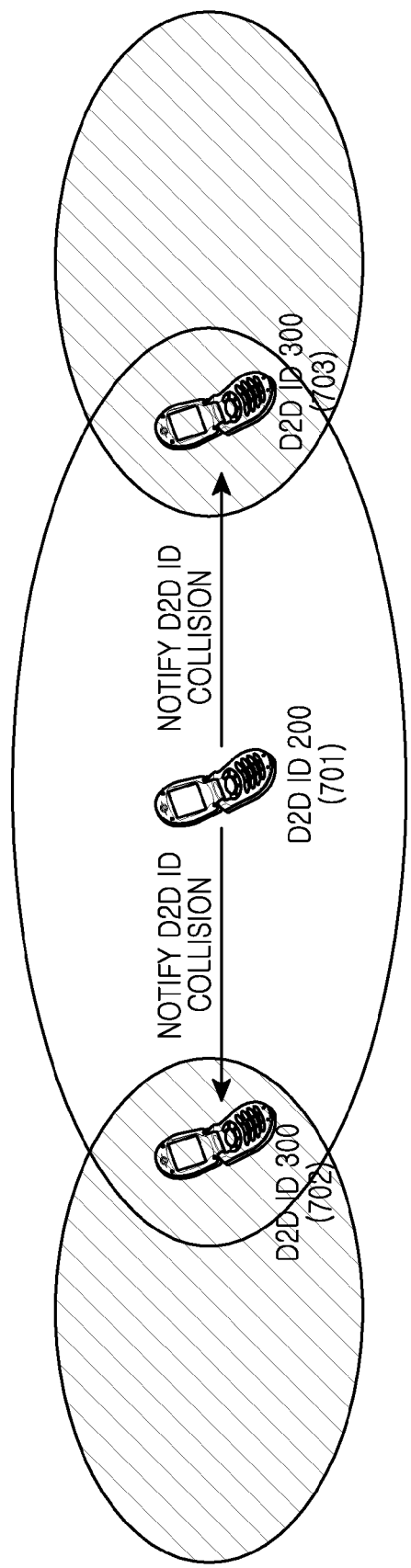
FIG. 7 is a diagram illustrating a method of notifying, by a user terminal, a D2D ID collision between adjacent terminals to the adjacent terminals in a method for allocating a D2D ID of the user terminal in an ad-hoc network according to an exemplary embodiment of the present invention.

FIG. 7 is a diagram illustrating a method for notifying, by a user terminal, a D2D ID collision between adjacent terminals to the adjacent terminals in a method for allocating a D2D ID of the user terminal in an ad-hoc network according to an exemplary embodiment of the present invention.

Referring to FIG. 7, terminals 702 and 703 located within a communication range of a user terminal 701 cannot share D2D ID information with each other. The reason for this is that the terminal 702 is not located within a communication range of the terminal 703 and the terminal 703 is not located within a communication range of the terminal 702.

In this case, the user terminal may receive D2D IDs transmitted by the terminals 702 and 703, determine that the D2D IDs of the terminals 702 and 703 are substantially identical as 300, and notify a D2D ID duplication to the terminals 702 and 703. A process thereof will be described below with reference to FIG. 8.

Figure 8:
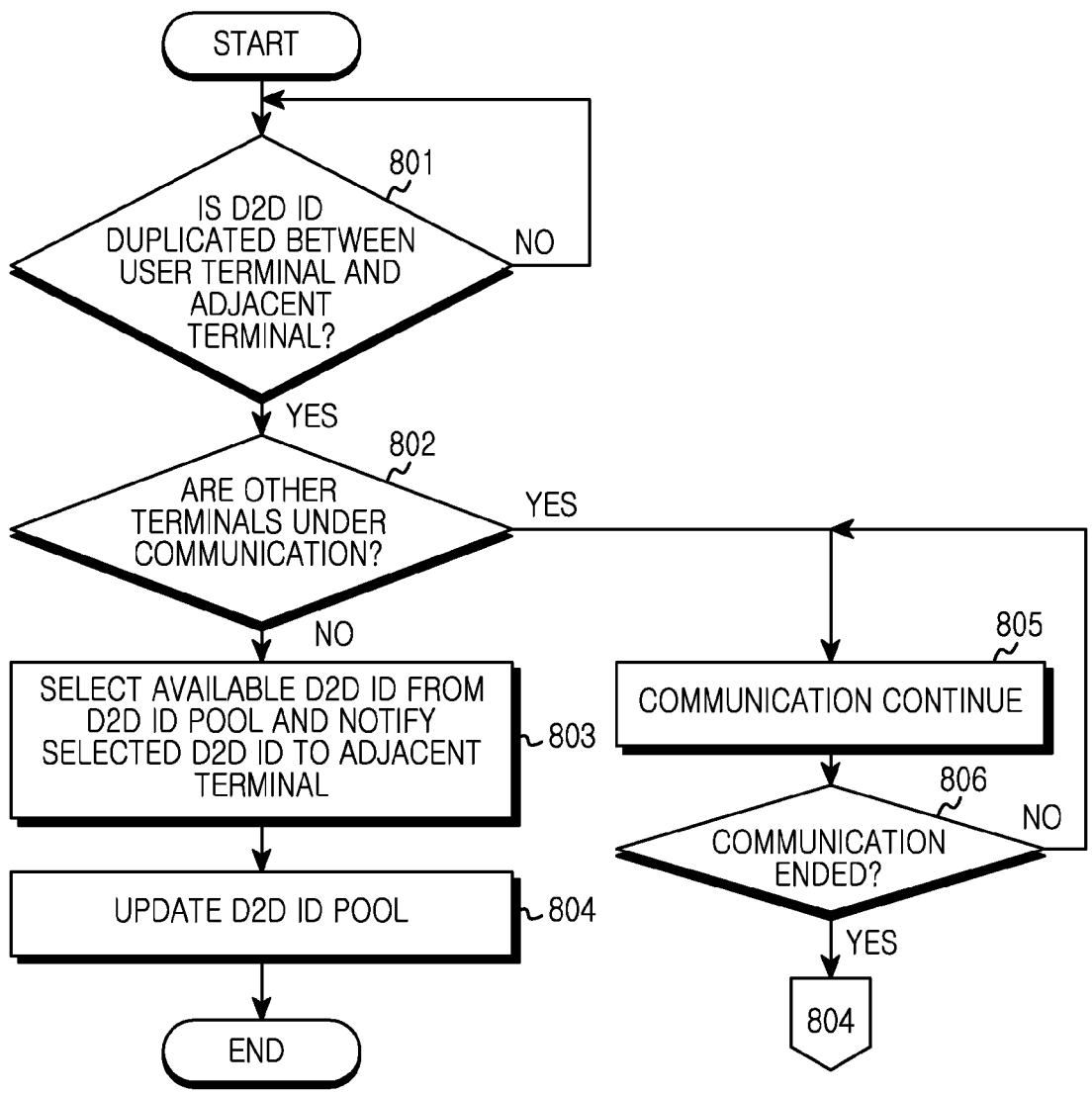
FIG. 8 is a flowchart illustrating a process of avoiding a D2D ID collision between adjacent terminals through a user terminal in a method for allocating a D2D ID of the user terminal in an ad-hoc network according to an exemplary embodiment of the present invention.

FIG. 8 is a flowchart illustrating a process of avoiding a D2D ID collision between adjacent terminals through a user terminal in a method for allocating a D2D ID of the user terminal in an ad-hoc network according to an exemplary embodiment of the present invention.

Referring to FIG. 8, the user terminal determines whether D2D IDs of two or more other terminals (i.e., an adjacent terminals) located within a predefined range from the user terminal are duplicated with each other at step 801.

When the D2D IDs of the two or more other terminals are duplicated with each other, the user terminal notifies a D2D ID duplication to the two or more other terminals, and the two or more other terminals determine whether they are under communication at step 802.

When the two or more other terminals are not under communication at step 802, the two or more other terminals execute a D2D ID pool to change the D2D IDs so that the D2D IDs are not duplicated with each other. Thereafter, one of the two or more other terminals transmits the changed D2D ID to the user terminal. When receiving the changed D2D ID, the user terminal transmits the received D2D ID to the other of the two or more other terminals at step 803.

After changing the D2D ID, the terminal updates the D2D ID pool at step 804 and completes the process.

On the other hand, when the two or more other terminals are under communication at step 802, the user terminal determines whether a communication is ended at steps 805 and 806. When the communication is ended, the user terminal repeats steps 803 and 804 and ends the process.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for allocating a Device-to-Device (D2D) IDentity (ID) of a user terminal, the method comprising:
    receiving a D2D ID of at least one other terminal located within a coverage area of the user terminal;
    determining whether the received D2D ID is identical to a D2D ID of the user terminal;

when the received D2D ID is identical to the D2D ID of the user terminal, determining whether a communication service is being executed by the user terminal;

when the communication service is not being executed by the user terminal, changing the D2D ID of the user terminal with reference to a D2D ID pool; and when the communication service is being executed by the user terminal, changing one of the received D2D ID of the at least one other terminal and the D2D ID of the user terminal, based on a priority of the communication service executed by the user terminal and a priority of a communication service executed by the at least one other terminal.

2. The method of claim 1, further comprising:
transmitting the changed D2D ID to the at least one other terminal; and
updating the D2D ID pool based on the changed D2D ID.

3. The method of claim 1, further comprising:
receiving a D2D ID change request message from the at least one other terminal, when the received D2D ID is identical to the D2D ID of the user terminal.

4. The method of claim 1, wherein the changing of the one of the received D2D ID of the at least one other terminal and the D2D ID of the user terminal comprises:
when the communication service is being executed by the user terminal, comparing the priority of the communication service executed by the user terminal with the priority of the communication service executed by the at least one other terminal;
when the priority of the communication service executed by the user terminal is lower than the priority of the communication service executed by the at least one other terminal, transmitting a peer standby message to a terminal communicating with the user terminal; and
changing the D2D ID of the user terminal with reference to a D2D ID pool.

5. The method of claim 4, further comprising:
when the priority of the communication service executed by the user terminal is higher than the priority of the communication service executed by the at least one other terminal, transmitting a D2D ID change rejection message to the at least one other terminal;
determining whether a D2D ID duplication end message indicating the end of a D2D ID duplication is received from the at least one other terminal;
when the D2D ID duplication end message is not received, transmitting a standby message to the peer terminal communicating with the user terminal; and
changing the D2D ID of the user terminal with reference to a D2D ID pool.

6. The method of claim 4, wherein the comparing of the priority of the communication service executed by the user terminal with the priority of the communication service executed by the at least one other terminal comprises:
determining whether the communication service executed by the user terminal is a real-time service; and
when the communication service executed by the user terminal is a real-time service, transmitting a D2D ID change rejection message to the at least one other terminal.

7. A method for allocating a Device-to-Device (D2D) IDentity (ID) of a user terminal, the method comprising:
when D2D IDs of at least two other terminals located within a coverage area of the user terminal are duplicated with each other, notifying a D2D ID duplication to the at least two other terminals;

receiving a changed D2D ID generated by at least one of the at least two other terminals and position information from the at least one of the at least two other terminals; and updating a D2D ID pool based on the received D2D ID.

8. The method of claim 7, further comprising: transmitting the received position information and the changed D2D ID to the at least one other terminal of the at least two other terminals.

9. The method of claim 7, wherein the at least two other terminals are not located within a coverage area of each other.

10. An apparatus for allocating a Device-to-Device (D2D) IDentity (ID) of a user terminal, the apparatus comprising:
a determination unit configured:
to receive a D2D ID of at least one other terminal located within a coverage area of the user terminal,
to determine whether the received D2D ID is identical to a D2D ID of the user terminal, when the received D2D ID is identical to the D2D ID of the user terminal,
to determine whether a communication service is being executed by the user terminal, when the communication service is not being executed by the user terminal,
to change the D2D ID of the user terminal with reference to a D2D ID pool, when the communication service is being executed by the user terminal,
to change one of the received D2D ID of the at least one other terminal and the D2D ID of the user terminal, based on a priority of the communication service executed by the user terminal and a priority of a communication service executed by the at least one other terminal; and
a storage unit configured to store information controlled by the determination unit.

11. The apparatus of claim 10, further comprising:
a communication module configured to transmit the changed D2D ID to the at least one other terminal; and
an update unit configured to update the D2D ID pool based on the changed D2D ID.

12. The apparatus of claim 10, further comprising a communication module configured to receive a D2D ID change request message from the at least one other terminal when the received D2D ID is identical to the D2D ID of the user terminal.

13. The apparatus of claim 10,
wherein, when the communication service is being executed by the user terminal, the determination unit is further configured:
to compare the priority of the communication service executed by the user terminal with the priority of the communication service executed by the at least one other terminal, and
to change the D2D ID of the user terminal with reference to a D2D ID pool, and
wherein the apparatus further comprises a communication unit configured to transmit a peer standby message to a terminal communicating with the user terminal, when the priority of the communication service executed by the user terminal is lower than the priority of the communication service executed by the at least one other terminal.

14. The apparatus of claim 13,
wherein the communication unit is configured:
to transmit a D2D ID change rejection message to the at least one other terminal when the priority of the communication service executed by the user terminal is higher than the priority of the communication service executed by the at least one other terminal, and to transmit a standby message to the peer terminal communicating with the user terminal when a D2D ID duplication end message is not received, and wherein the determination unit is further configured:

to determine whether a D2D ID duplication end message indicating the end of a D2D ID duplication is received from the at least one other terminal, and to change the D2D ID of the user terminal with reference to a D2D ID pool.

15. The apparatus of claim 13, wherein the determination unit is further configured to determine whether the communication service executed by the user terminal is a real-time service, and when the communication service executed by the user terminal is a real-time service, the communication unit is further configured to transmit a D2D ID change rejection message to the at least one other terminal.

16. An apparatus for allocating a Device-to-Device (D2D) IDentity (ID) of a user terminal, the apparatus comprising:

a determination unit configured to determine whether D2D IDs of at least two other terminals located within a predefined range from the user terminal are duplicated with each other;

a communication module configured:

to notify, when the D2D IDs of the at least two other terminals located within a coverage area of the user terminal are duplicated with each other, a D2D ID duplication to the at least two other terminals, to receive a changed D2D ID generated by at least one of the at least two other terminals and position information from the at least one of the at least two other terminals; and an update unit configured to update a D2D ID pool based on the received D2D ID.

17. The apparatus of claim 16, wherein the communication module is further configured to transmit the received position information and changed D2D ID to the at least one other terminal of the at least two other terminals.

18. The apparatus of claim 16, wherein the at least two other terminals are not located within a coverage area of each other.

* * * * *